2 Sheets—Sheet 1.
W. H. COX.
GATE.
No. 10,795. Reissued Jan. 4, 1887.
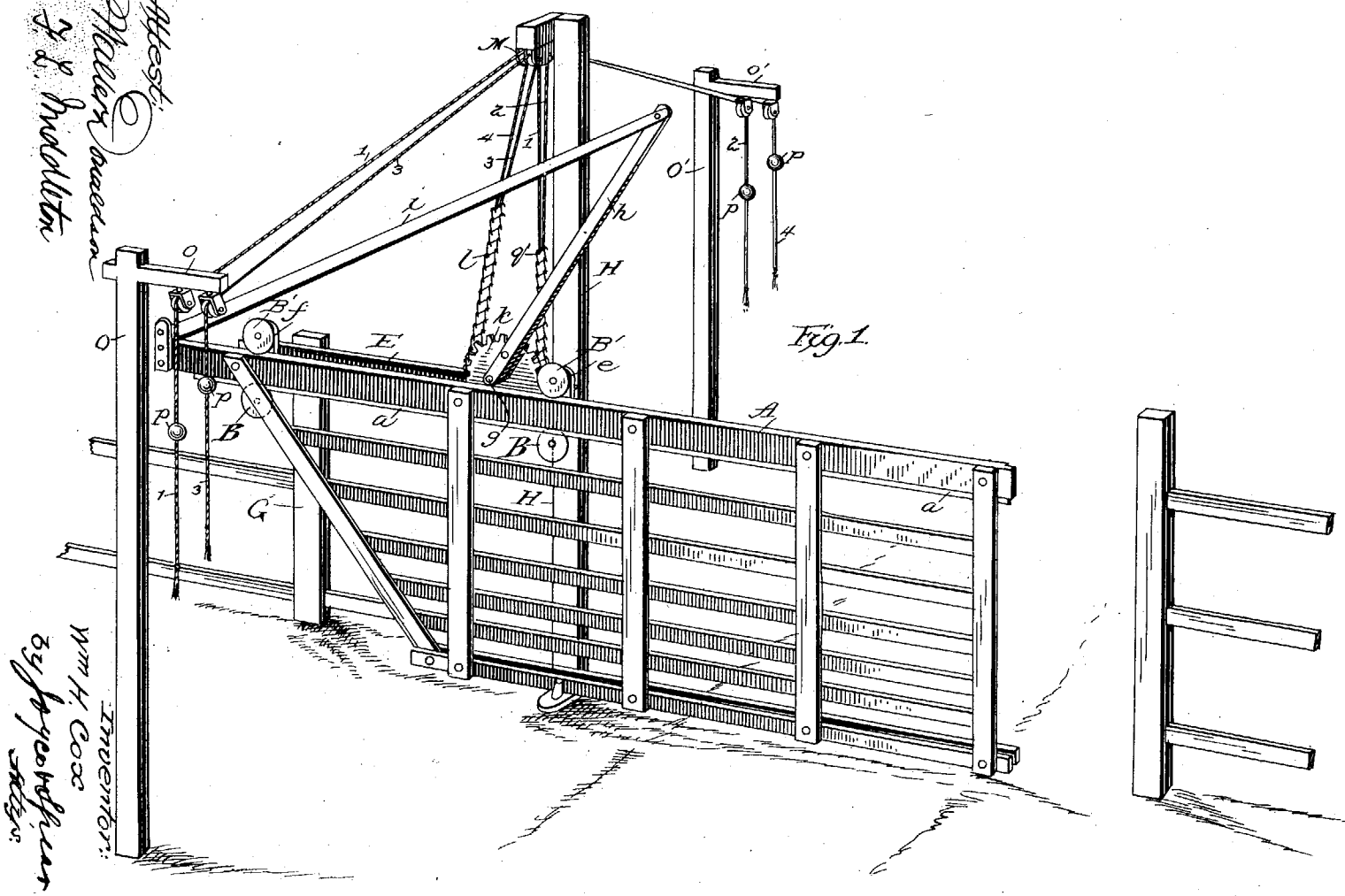
N. PETERS, Photo-Lithographer, Washington, D. C.

2 Sheets—Sheet 2.
W. H. COX.
GATE.
No. 10,795. Reissued Jan. 4, 1887.
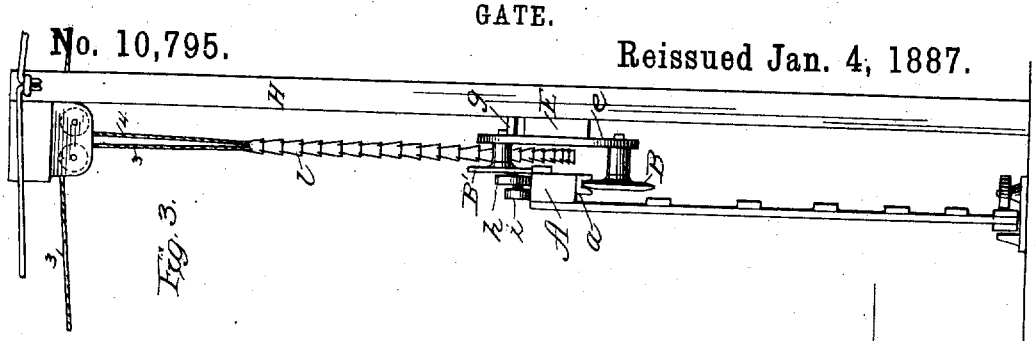
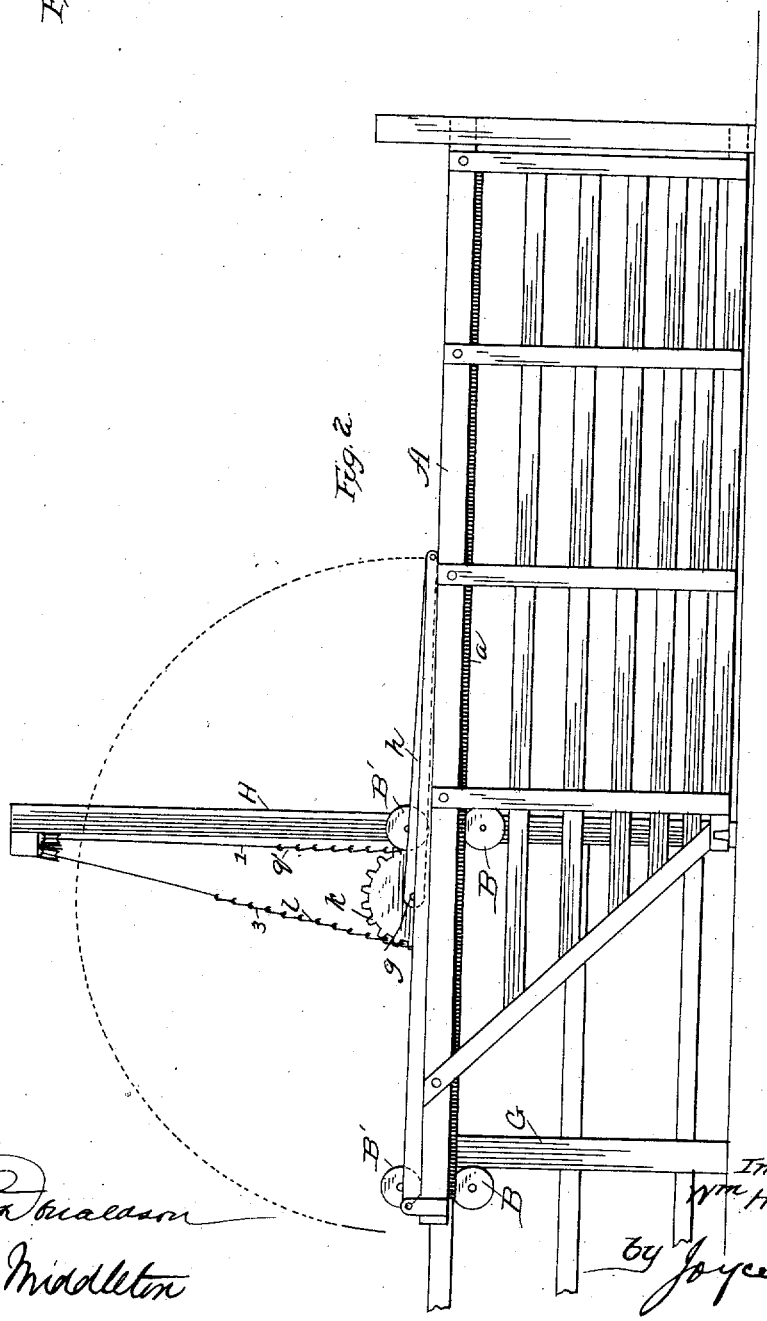
Attest:
Allen Duncan
F. L. Middleton
Inventor
Wm. H. Cox
by Joyce & Shear
Att'ys.
N. PETERS, Photo-Lithographer, Washington, D. C.

UNITED STATES PATENT OFFICE.

WILLIAM H. COX, OF VIRDEN, ILLINOIS.

GATE.

SPECIFICATION forming part of Reissued Letters Patent No. 10,795, dated January 4, 1887.

Original No. 336,471, dated February 16, 1886. Application for reissue filed May 1, 1886. Serial No. 200,881.

*To all whom it may concern:*

Be it known that I, WILLIAM H. COX, of Virden, in the county of Macoupin and State of Illinois, have invented a new and useful Improvement in Gates; and I do hereby declare that the following is a full, clear, and exact description of the same.

My invention relates to gates of that class which are adapted to be operated by persons riding, without requiring them to dismount either to open or close the gate.

The object of my invention is to simplify the mechanism for operating the gate, to render its operation more certain, and to move the gate by slight movements of the impelling-rope, so that the gate may be readily and easily opened by the person desiring to pass.

In the accompanying drawings, Figure 1 represents a perspective view of the gate partly open; and Fig. 2 is a side elevation of the operating mechanism, showing the gate in closed position. Fig. 3 is an end view of the gate.

The gate A slides horizontally upon wheels B B, mounted suitably upon posts or bars. A track, *a*, fixed to the under side of the top rail of the gate, is adapted to these wheels, and allows the gate to run smoothly, suspended upon the wheels. The top rail, with the track, is prolonged sufficiently to the rear to give the gate proper movement, and upper wheels, B′, bearing upon the upper part of the top rail, serve to keep it in place; but I do not confine myself to this mode of suspending the gate, as other means may be used, or the gate may be run upon a track on the ground. As represented, the supporting and guiding wheels are mounted upon studs in vertically-arranged plates *e f*. These plates are fixed to a cross-bar, E, which is fixed to posts G H, set in the ground on one side of the gate and in a plane parallel to that of its movement.

In suitable journals on bar E, I mount a shaft, *g*, upon which I fix a crank-arm, *h*, adapted to swing above the gate upon the shaft in the same plane in which the gate moves. The free end of this arm I connect by a rod or bar, *i*, to the end of the upper bar of the gate, forming the connection by pivots. When, therefore, the shaft is rotated, the arm is swung through a half-circle, or a little more, from the top of the gate upon one side to a similar position on the other, and the gate is opened or closed, the arm being in length equal to half the movement required of the gate.

It will be observed by an inspection of Fig. 1, and more plainly in Fig. 2, that the crank-arm *h* is made shorter than the connecting rod or bar *i*. This is essential, and constitutes an important feature in my invention. A crank and rod connecting the crank to the sliding gate have been known, being shown in the United States Patent of Fox and Richey, No. 305,382, of 1884; also, in the United States Patent of White, No. 282,140, of 1883. In these the crank and connecting-bar are of equal length. The result of this is that the crank can move only through a quarter-circle, and then reaches a dead-point. Further, as it approaches that point it acts at immense disadvantage by reason of lifting too much on the gate. In my construction practically no dead-point occurs. The crank operates through a semicircle and with greater initial and terminal force.

In order to rotate the shaft *g*, I fix thereon the sprocket-wheel *k*, around which I pass a chain, *l*. The ends of this chain are carried upward and connected to ropes, through which the sprocket-wheel is moved. The post H is carried up a sufficient distance, so that the top of it may carry the ropes above the sweep of the crank-arm. Two ropes are attached to each end of the sprocket-chain. The rope 1 is carried up through the sheave in the block M, and thence to one side over a block supported on the arm *o* of a post, O, the arm *o* extending over the roadway on one side of the gate. The rope 2 from the same end of the sprocket-chain runs through another sheave in the pulley M, over the block on the arm *o′* of a post, O′, on the same side of the roadway, but on the other side of the gate, the arm *o′* also extending partly over the roadway. To the other end of the sprocket-chain are attached ropes 3 and 4, rope 3 running to a block on the arm *o* and rope 4 running to a block on the arm *o′*. The rope ends of each arm hang down near each other.

To hold the rope vertically and to take up the slack on each side as the other side is pulled, I provide each rope with a weight, *p*. It will be observed that ropes 1 and 3 are upon one side and 2 and 4 upon the other side of the gate. The pulling of rope 1 will draw upon the end

*q* of the sprocket-chain to open the gate, and will draw upon the inner ends of the ropes 3 and 4, raising their outer ends, as shown in full lines in Fig. 1. After the rider has passed through the gate he may pull upon rope 4 on the other side, and thus close the gate, which has been opened by pulling on rope 1. In the same way the pulling of rope 2 will open the gate, and rope 3 will close the gate. It will also be observed that when the gate is closed the crank-arm lies down upon the upper bar of the gate, its pivotal shaft being only slightly above this bar. This carries the bar or rod *i*, pivoted in the free end of the crank-arm, slightly below the axis of its pivoting-shaft, which locks the gate in a closed position and prevents it from being opened by accident or by the rubbing or pushing of animals.

I claim as my invention—

In combination, the sliding gate, the crank-arm supported above the top of the gate in line therewith, a rod longer than the crank-arm connecting the free end thereof with the top of the gate, a wheel in connection with the fixed end of the crank-arm, and operating cords or ropes 1 2, in connection with the wheel upon one side, and running one to a support upon one side and the other to a support upon the other side of the gate, and ropes 3 4, in connection with the other side of the wheel, running one to a support upon one side and the other to a support upon the other side of the gate, all substantially as described.

In testimony whereof I have signed my name to this specification in the presence of two subscribing witnesses.

WM. H. COX.

Witnesses:
G. H. Cox,
H. C. Bradley.